(12) United States Patent
Cho et al.

(10) Patent No.: US 8,520,623 B2
(45) Date of Patent: Aug. 27, 2013

(54) METHOD AND APPARATUS FOR TRANSMITTING AND RECEIVING DOWNLINK SIGNAL FOR WHICH GUARD BAND IS CONFIGURED IN CELLULAR RADIO COMMUNICATION SYSTEM SUPPORTING BAND SCALABILITY

(75) Inventors: Joon Young Cho, Suwon-si (KR); In Ho Lee, Suwon-si (KR); Ju Ho Lee, Suwon-si (KR)

(73) Assignee: Samsung Electronics Co., LTD (KR)

( * ) Notice: Subject to any disclaimer, the term of this patent is extended or adjusted under 35 U.S.C. 154(b) by 167 days.

(21) Appl. No.: 13/201,777

(22) PCT Filed: Feb. 16, 2010

(86) PCT No.: PCT/KR2010/000940
§ 371 (c)(1),
(2), (4) Date: Sep. 13, 2011

(87) PCT Pub. No.: WO2010/093216
PCT Pub. Date: Aug. 19, 2010

(65) Prior Publication Data
US 2011/0317647 A1      Dec. 29, 2011

(30) Foreign Application Priority Data
Feb. 16, 2009   (KR) .................. 10-2009-0012227

(51) Int. Cl.
*H04W 4/00*   (2009.01)
(52) U.S. Cl.
USPC ........... 370/329; 455/110; 455/434; 455/424; 370/208; 370/252

(58) Field of Classification Search
USPC ........... 455/424, 510; 370/329, 208; 398/65; 709/201; 385/24
See application file for complete search history.

(56) References Cited

U.S. PATENT DOCUMENTS

| | | |
|---|---|---|
| 2003/0016731 A1 | 1/2003 | Uesugi |
| 2003/0058975 A1 | 3/2003 | Baas et al. |
| 2007/0201347 A1 | 8/2007 | Geile |
| 2009/0232071 A1* | 9/2009 | Cho et al. ............ 370/329 |
| 2011/0211489 A1* | 9/2011 | Chung et al. .......... 370/252 |

OTHER PUBLICATIONS

PCT/ISA/237 Written Opinion issued on PCT/KR2010/000940 (4 pp.).
PCT/ISA/210 Search Report issued on PCT/KR2010/000940 (6 pp.).

* cited by examiner

*Primary Examiner* — Andrew Lai
*Assistant Examiner* — Jamaal Henson
(74) *Attorney, Agent, or Firm* — The Farrell Law Firm, P.C.

(57) ABSTRACT

Disclosed is a configuration of a guard band for a radio communication system formed of consecutive sub-bands. Particularly disclosed are designs of a middle guard band for preventing interference between adjacent sub-bands and regulating a difference in frequency between signals transmitted in each sub-band in a radio communication system such as a multi-carrier OFDM system and a multi-carrier CDMA system that forms a wideband through carrier aggregation. Related transmission/reception method and apparatus are further disclosed.

10 Claims, 13 Drawing Sheets

METHOD AND APPARATUS FOR TRANSMITTING AND RECEIVING DOWNLINK SIGNAL FOR WHICH GUARD BAND IS CONFIGURED IN CELLULAR RADIO COMMUNICATION SYSTEM SUPPORTING BAND SCALABILITY

PRIORITY

This application claims priority to International Patent Appl. No. PCT/KR2010/000940 filed Feb. 16, 2010, and to Korean Patent Application No. 10-2009-0012227 filed Feb. 16, 2009, the disclosure of each of which is incorporated herein by reference.

BACKGROUND OF THE INVENTION

1. Field of the Invention

The present invention relates in general to a cellular radio communication system supporting bandwidth scalability and, more particularly, to a method and an apparatus for transmitting and receiving a downlink signal with a guard band between adjacent sub-bands in the cellular radio communication system supporting bandwidth scalability.

2. Description of the Related Art

In these days, OFDM (Orthogonal Frequency Division Multiplexing) technology is being widely used for mobile communication systems.

OFDM technology has many advantages of removing interference between multipath signal components from a radio communication channel, guaranteeing the orthogonality among multiple-access users, and allowing an effective use of a frequency resource. Thereby OFDM technology is useful in a high-rate data transmission and a wideband system in comparison with DS-CDMA (Direct Sequence Code Division Multiple Access).

FIG. 1 is a diagram illustrating a frame structure of OFDM-based downlink.

Particularly, FIG. 1 shows a frame structure of OFDM-based downlink in EUTRA (Enhanced Universal Terrestrial Radio Access) which is the next generation mobile communication standard of 3GPP (3$^{rd}$ Generation Partnership Project).

Referring to FIG. 1, 20 MHz system bandwidth 101 contains one hundred resource blocks (RB) 102. A single RB is composed of twelve subcarriers 103 with frequency space of 15 kHz between adjacent subcarriers. There are fourteen OFDM symbol intervals 104, and a modulated symbol of a downlink channel is transmitted through each subcarrier 103 in each OFDM symbol interval 104. Each subcarrier section in each OFDM symbol interval is referred to as a resource element (RE) 106. As shown in FIG. 1, a single RB contains total one hundred sixty-eight REs (i.e., the product of fourteen OFDM symbols and twelve subcarriers). In a single OFDM symbol interval 104, one or more RBs may be allotted to transmission of a single downlink data channel, depending on data transfer rate.

FIG. 2 is a diagram illustrating a frequency domain mapping between a synchronization channel and a broadcasting channel according to system bandwidth in LTE system downlink.

One of important issues for offering a high-rate radio data service in a cellular radio communication service is to support scalable bandwidth. For example, the LTE (Long Term Evolution) system may have a variety of bandwidths such as 20 MHz, 15 MHz, 10 MHz, 5 MHz, 3 MHz, 1.4 MH, etc. Service providers may select one of such bandwidths to provide their services, and also user equipment may have various types such as a type for supporting bandwidths up to 20 MHz or a type for supporting 1.4 MHz bandwidth only. Additionally, the LTE-Advanced (hereinafter, referred to as LTE-A) system that has a goal to offer a service with a level required by the IMT-Advanced may provide a wideband service having 100 MHz bandwidth through carrier aggregation of LTE carriers.

Under a system based on scalable bandwidth, any user equipment that accesses initially the system has no information about system bandwidth and thus should be able to succeed in a cell search. Through this cell search, the user equipment may acquire a cell ID and synchronization between a transmitter and a receiver for demodulation of data and control information. System bandwidth may be obtained from a synchronization channel (hereinafter, referred to as SCH) during a cell search or obtained through demodulation of a broadcasting channel (hereinafter, referred to as BCH) after a cell search. The BCH is a channel for transmitting system information about a specific cell accessed by user equipment. After a cell search, user equipment demodulates the BCH before anything else. By receiving the BCH, user equipment may obtain cell information such as system bandwidth, an SFN (system Frame Number), and setting of some physical channels.

FIG. 2 exemplarily shows transmission of SCH and BCH according to system bandwidth. Use equipment performs a cell search through the SCH and, after a successful cell search, obtains system information about each cell through reception of the BCH.

In FIG. 2, a reference number 200 indicates the frequency axis. SCH 204 and BCH 206 are transmitted with 1.08 MHz bandwidth through a middle part of a system band, regardless of system bandwidth. Therefore, user equipment acquires an initial synchronization for a system by finding an RF carrier 202 regardless of system bandwidth and then performing a cell search for the SCH 204 in 1.08 MHz bandwidth around the RF carrier 202. After a cell search, user equipment obtains system information by demodulating the BCH 206 transmitted through the same 1.08 MHz bandwidth.

FIG. 3 is a diagram illustrating a transmission structure of SCH and BCH through a radio frame in the LTE system.

FIG. 3 shows transmission of SCH and BCH in a 10 ms radio frame 306. The SCH is divided into a primary synchronization signal (PSS) 300 and a secondary synchronization signal (SSS) 301 and transmitted at subframes #0 and #5. Each of the PSS 300 and the SSS 301 has one OFDM symbol interval 308 and is transmitted through 1.08 MHz bandwidth of a middle part in the entire system bandwidth 303 as shown in FIG. 2. The BCH 302 is transmitted using four OFDM symbol intervals at a subframe #0.

The LTE-A system requires a wideband for a higher-rate data transmission than the LTE system. Additionally, backward compatibility for LTE user equipment is also important, and LTE user equipment should be allowed to access the LTE-A system.

For the above, in downlink of the LTE-A system, the entire system band is divided into sub-bands with bandwidth allowing LTE user equipment to receive. LTE-A equipment available for higher receiving bandwidth may receive data through all sub-bands.

In case of the LTE-A system based on aggregation of LTE carriers, an effective solution to allow an OFDM transmitter of a base station to transmit signals in a useful band of LTE carrier by using only a single IFFT (Inverse Fast Fourier Transform) unit is required.

BRIEF SUMMARY OF THE INVENTION

Accordingly, the present invention is to address the above-mentioned problems and/or disadvantages and to offer at least the advantages described below.

An aspect of the present invention is to provide a method and an apparatus for transmitting and receiving a downlink signal with a middle guard band in a radio communication system that forms a wideband through carrier aggregation.

Another aspect of the present invention is not only to realize a transmitter and a receiver with low complexity when a middle guard band is formed, but also to allow user equipment to use a synchronization channel (SCH), transmitted in each useful band, for a cell search.

According to one aspect of the present invention, provided is a method for transmitting a downlink signal with a guard band between at least two sub-bands at a base station in a cellular radio communication system that supports bandwidth scalability, the method comprising: mapping a signal to an IFFT (Inverse Fast Fourier Transform) input corresponding to a useful band except a middle guard band between adjacent sub-bands among the at least two sub-bands; and transmitting the mapped signal, wherein bandwidth of the middle guard band is determined such that an interval between center frequencies of the adjacent sub-bands becomes a common multiple of subcarrier spacing and a frequency raster default value.

In this method, the bandwidth of the middle guard band may be determined using the following Equation: Bandwidth of Middle Guard Band=m*G+G−MOD (A+B+D, G) wherein m is zero or positive integer, wherein G is the least common multiple of the subcarrier spacing and the frequency raster default value, wherein each of A and B is half bandwidth of each useful band of the adjacent sub-bands, and wherein D is bandwidth of DC subcarrier.

According to another aspect of the present invention, provided is a method for receiving a downlink signal with a guard band between at least two sub-bands at user equipment in a cellular radio communication system that supports bandwidth scalability, the method comprising: mapping a received signal to an FFT (Fast Fourier Transform) output, the received signal corresponding to a useful band except a middle guard band between adjacent sub-bands among the at least two sub-bands; and receiving the mapped signal, wherein bandwidth of the middle guard band is determined such that an interval between center frequencies of the adjacent sub-bands becomes a common multiple of subcarrier spacing and a frequency raster default value.

In this method, the bandwidth of the middle guard band may be determined using the following Equation: Bandwidth of Middle Guard Band=m*G+G−MOD (A+B+D, G) wherein m is zero or positive integer, wherein G is the least common multiple of the subcarrier spacing and the frequency raster default value, wherein each of A and B is half bandwidth of each useful band of the adjacent sub-bands, and wherein D is bandwidth of DC subcarrier.

Additionally, the bandwidth of the middle guard band may be calculated using the Equation after the m, which is a bandwidth system parameter of the middle guard band, and bandwidth of each useful band of the adjacent sub-bands are acquired from a base station.

According to still another aspect of the present invention, provided is an apparatus for transmitting a downlink signal with a guard band between at least two sub-bands at a base station in a cellular radio communication system that supports bandwidth scalability, the apparatus comprising: an IFFT (Inverse Fast Fourier Transform) unit configured to receive signals to be transmitted, to perform IFFT on the signals, and output the signals; a subcarrier symbol mapper configured to perform a mapping of the signal to an IFFT input corresponding to a useful band except a middle guard band between adjacent sub-bands among the at least two sub-bands; and a controller configured to determine bandwidth of the middle guard band such that an interval between center frequencies of the adjacent sub-bands becomes a common multiple of subcarrier spacing and a frequency raster default value.

In this apparatus, the controller may be further configured to determine the bandwidth of the middle guard band through the following Equation: Bandwidth of Middle Guard Band=m*G+G−MOD (A+B+D, G) wherein m is zero or positive integer, wherein G is the least common multiple of the subcarrier spacing and the frequency raster default value, wherein each of A and B is half bandwidth of each useful band of the adjacent sub-bands, and wherein D is bandwidth of DC subcarrier.

According to yet another aspect of the present invention, provided is an apparatus for receiving a downlink signal with a guard band between at least two sub-bands at user equipment in a cellular radio communication system that supports bandwidth scalability, the apparatus comprising: an FFT (Fast Fourier Transform) unit configured to perform FFT on received signals and to output the signals; symbol receivers configured to receive FFT outputs in corresponding channels and to demodulate the outputs; a subcarrier symbol demapper configured to perform a mapping of the signal to the FFT output, the signal corresponding to a useful band except a middle guard band between adjacent sub-bands among the at least two sub-bands, and then to enter the mapped FFT output into the symbol receivers; and a controller configured to determine bandwidth of the middle guard band such that an interval between center frequencies of the adjacent sub-bands becomes a common multiple of subcarrier spacing and a frequency raster default value.

In this apparatus, the controller may be further configured to determine the bandwidth of the middle guard band through the following Equation: Bandwidth of Middle Guard Band=m*G+G−MOD (A+B+D, G) wherein m is zero or positive integer, wherein G is the least common multiple of the subcarrier spacing and the frequency raster default value, wherein each of A and B is half bandwidth of each useful band of the adjacent sub-bands, and wherein D is bandwidth of DC subcarrier.

Additionally, the controller may be further configured to calculate the bandwidth of the middle guard band through the Equation after acquiring the m, which is a bandwidth system parameter of the middle guard band, and bandwidth of each useful band of the adjacent sub-bands from a base station.

Therefore, this invention may allow the LTE-A system forming a wideband through carrier aggregation to transmit and receive signals contained in each LTE sub-band by using a single IFFT unit and a single FFT unit, thus reducing complexity in a transmitter of the base station and a receiver of the user equipment. Additionally, this invention may allow the user equipment to receive SCH transmitted in each sub-band and also to use it for a cell search.

Other aspects, advantages and salient features of the invention will become apparent to those skilled in the art from the following detailed description, which, taken in conjunction with the annexed drawings, discloses exemplary embodiments of the invention.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

While the disclosed embodiments are provided using the OFDM-based radio communication system, especially the 3GPP EUTRA standard, it will be understood by those skilled in the art that main features of this invention may be favorably applied to any other communication systems without departing from the spirit and scope of the invention.

One of main features of this invention is to provide methods of forming a middle guard band in a wideband radio communication system using carrier aggregation. Particularly, this invention realizes a transmitter of a base station and a receiver of user equipment with low complexity when forming the middle guard band, and allows the user equipment to use a synchronization channel (SCH), transmitted in each useful band, for a cell search.

Figure 4:
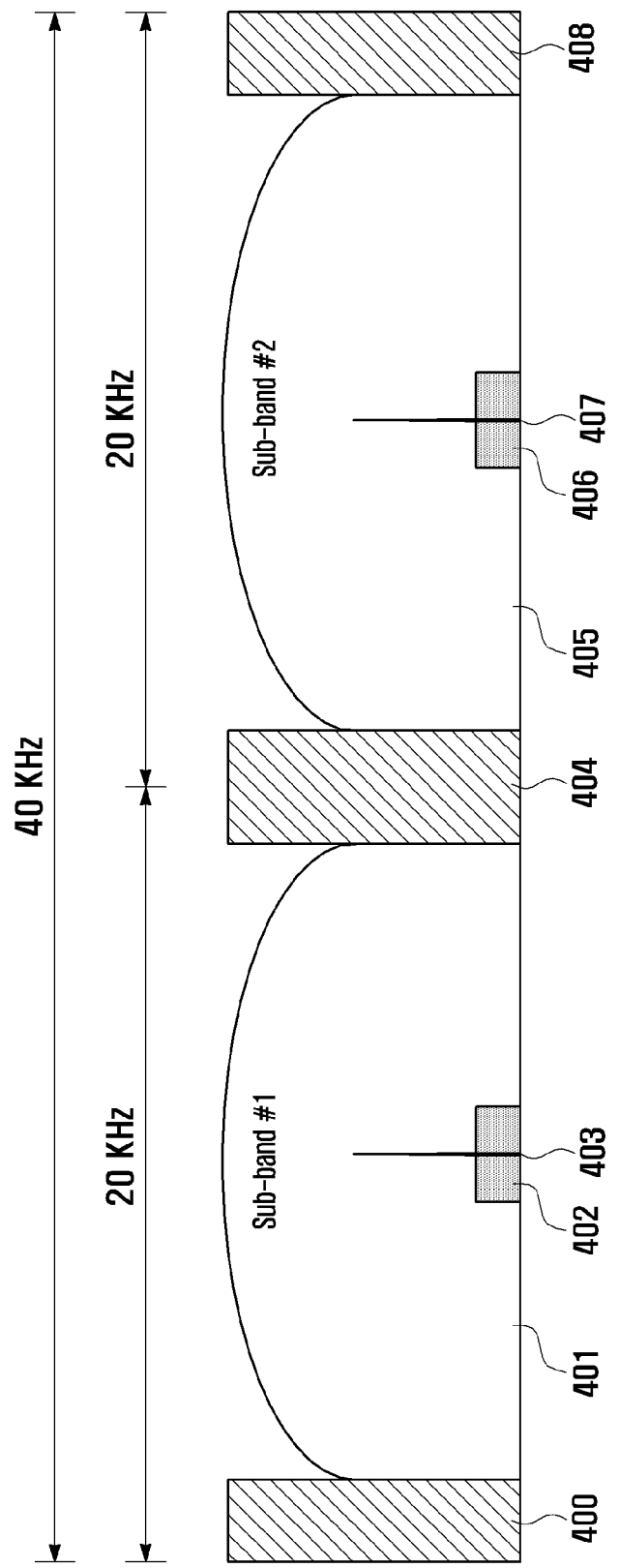
FIG. 4 is a diagram illustrating an example of a downlink frame in accordance with an exemplary embodiment of the present invention.

FIG. 4 is a diagram illustrating an example of a downlink frame in accordance with an exemplary embodiment of the present invention.

FIG. 4 shows the LTE-A system band with 40 MHz bandwidth formed by the aggregation of two LTE carriers with 20 MHz bandwidth. Each of a sub-band #1 401 and a sub-band #2 405 is a useful band of a 20 MHz LTE carrier and transmits a downlink signal therein. Each of reference numbers 402 and 406 indicates SCH which is transmitted to allow user equipment to perform a cell search in each useful band. Each of reference numbers 403 and 407 indicates a DC subcarrier through which no signal is transmitted. Each of reference numbers 400 and 408 indicates a guard band, and a reference number 404 indicates a middle guard band that prevents interference between adjacent useful bands 401 and 405 or is used for regulating a difference in frequency between signals transmitted in useful bands.

Particularly, in case of the LTE-A system formed of a plurality of LTE carriers as shown in FIG. 4, bandwidth of the middle guard band 404 is set to a multiple (i.e., an exact number of times) of subcarrier spacing such that an OFDM transmitter of a base station can transmit a plurality of LTE carrier useful band signals by using a single IFFT (Inverse Fast Fourier Transform) unit alone.

If bandwidth of the middle guard band is not a multiple of subcarrier spacing, the base station transmitter should use two IFFT units each corresponding to 20 MHz bandwidth, in case of FIG. 4, and thereby separately transmit channels of the useful bands 401 and 405.

According to embodiments of this invention, bandwidth of the middle guard band 404 is set to a multiple of subcarrier spacing. So, in case of FIG. 4, it is possible to transmit all downlink channel signals contained in the useful bands 401 and 405 through a single IFFT unit corresponding to 40 MHz bandwidth.

A way to reduce the complexities of a transmitter and a receiver at a base station and user equipment is to set bandwidth of the middle guard band to a multiple of subcarrier spacing as discussed above. Therefore, the base station can transmit downlink signals contained in the LTE sub-bands of the entire system band by using a single IFFT unit, and also the user equipment can receive the signals by using a single FFT (Fast Fourier Transform) unit corresponding to the entire system bandwidth.

Additionally, in order for user equipment to receive the SCH transmitted in each sub-band and to use it for a cell search, the center frequency of the SCH should be present on a frequency raster defined in a standard. In the 3GPP standard, this frequency raster is set to 100 kHz intervals. In case of FIG. 4, the frequency of the DC subcarriers 403 and 407 corresponding to the center frequency of the SCHs 402 and 406 should be a multiple of 100 kHz such that user equipment can receive the SCHs and use them for a cell search.

Figure 1:
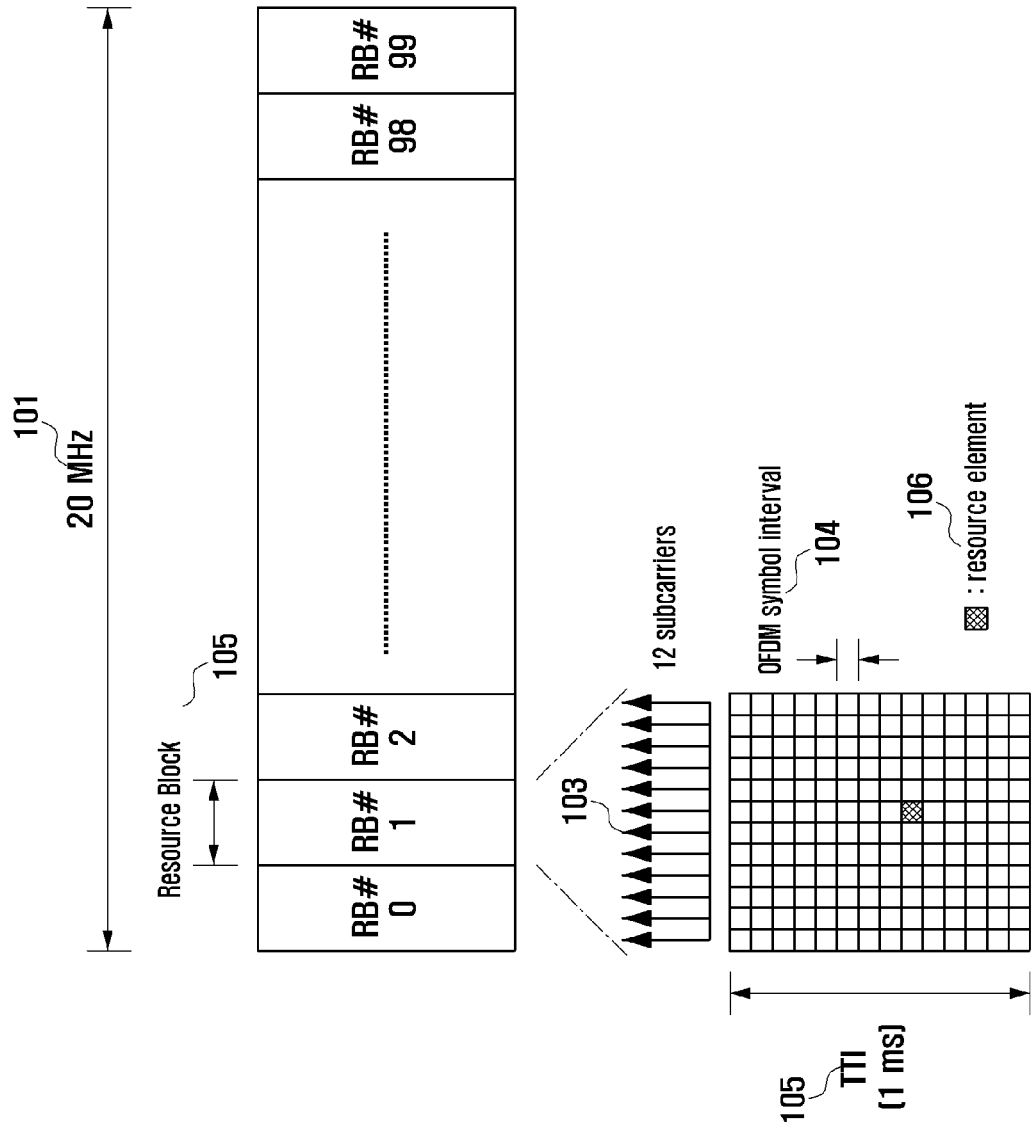
FIG. 1 is a diagram illustrating a frame structure of OFDM-based downlink.
Figure 2:
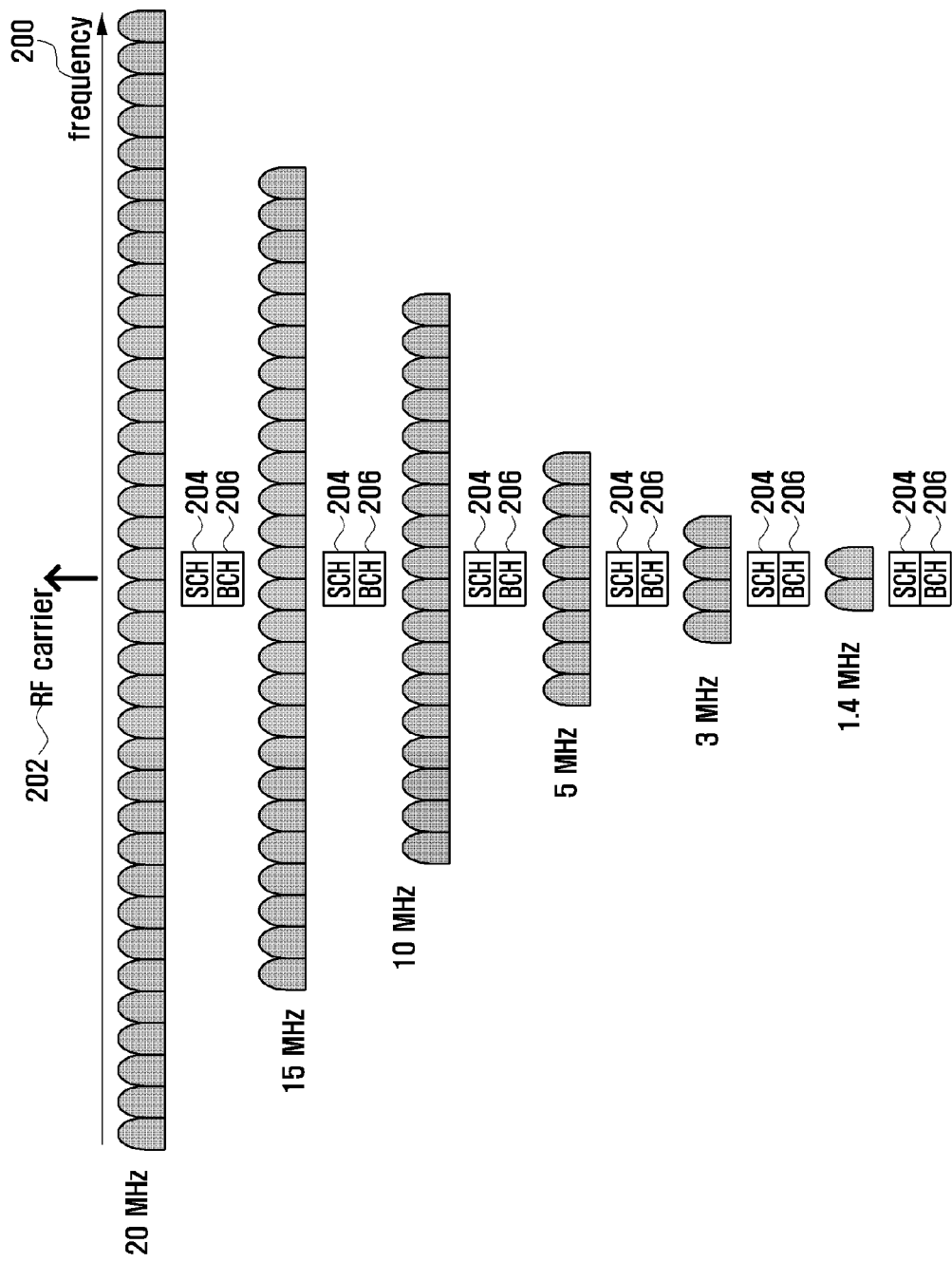
FIG. 2 is a diagram illustrating a frequency domain mapping between a synchronization channel and a broadcasting channel according to system bandwidth in LTE system downlink.
Figure 3:
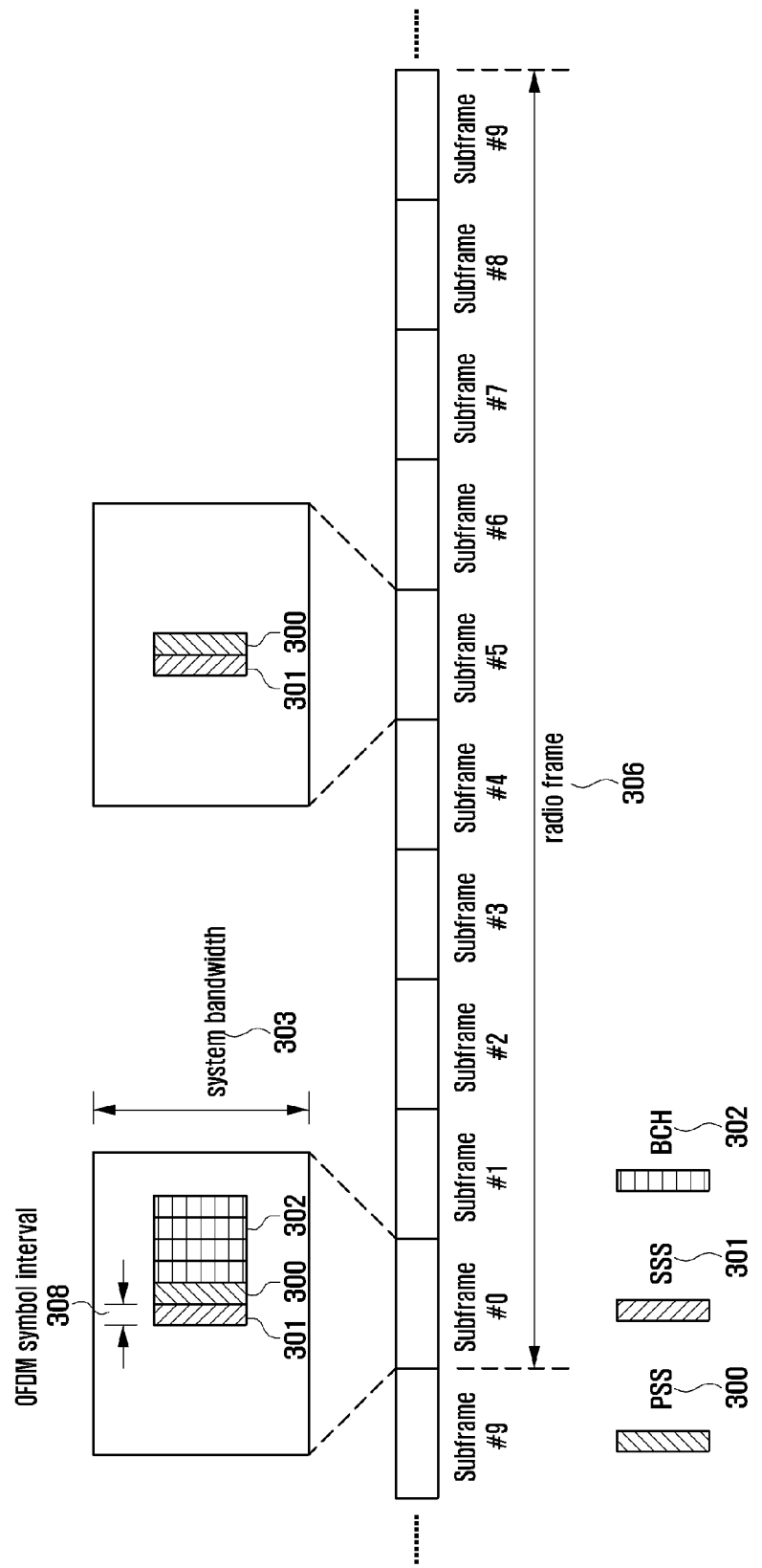
FIG. 3 is a diagram illustrating a transmission structure of SCH and BCH through a radio frame in the LTE system.

Therefore, this invention proposes a design methodology for the middle guard band, which is based on the above-discussed two conditions that the base station transmitter is allowed to send channel signals transmitted in each sub-band by using a single IFFT unit alone and that the center frequency of the SCH in each sub-band should be a multiple of the value of a frequency raster. Meanwhile, since the LTE system may have various system bandwidths as shown in FIG. 2, a design for the middle guard band may be varied according to bandwidths of adjacent sub-bands. The design methodology proposed herein may be similarly applied to case of uplink having band extension through carrier aggregation.

Now, a design methodology for the middle guard band proposed by this invention and also related transmitting/receiving methods and apparatuses will be described through various embodiments.

First Embodiment

Figure 5:
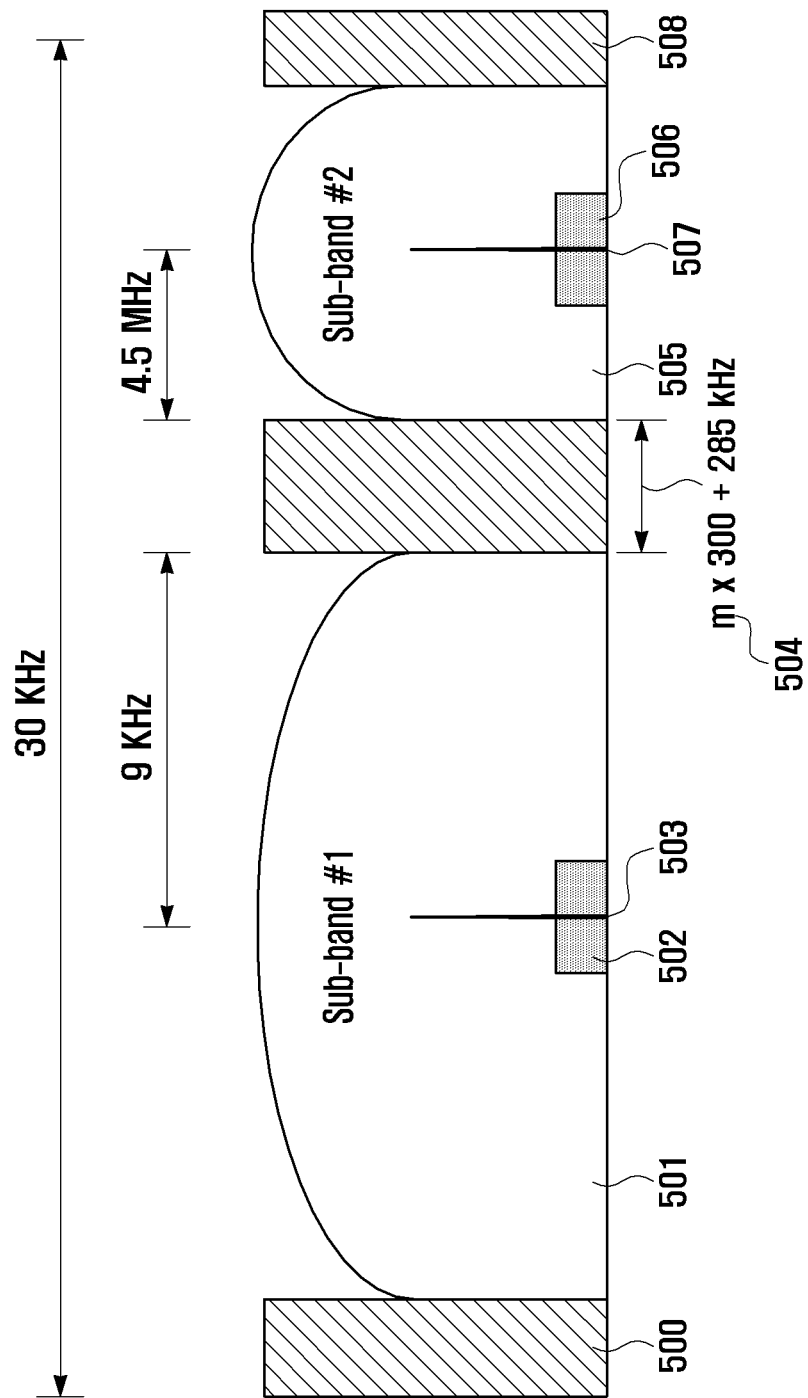
FIG. 5 is a diagram illustrating a method for setting bandwidth of a middle guard band in accordance with an exemplary embodiment of the present invention.

FIG. 5 is a diagram illustrating a method for setting bandwidth of a middle guard band in accordance with an exemplary embodiment of the present invention.

FIG. 5 shows the LTE-A system band with 30 MHz bandwidth formed by the aggregation of one LTE carrier with 20 MHz bandwidth and the other LTE carrier with 10 MHz bandwidth.

In sub-bands #1 and #2, reference numbers 501 and 505 indicate a useful band of a 20 MHz LTE carrier and a useful band of a 10 MHz LTE carrier, respectively, and downlink signals are transmitted in the useful bands. Reference numbers 502 and 506 indicate SCHs each of which is transmitted to allow user equipment to perform a cell search in each useful band. Reference numbers 503 and 507 indicate DC subcarriers through which no signal is transmitted.

Reference numbers 500 and 508 indicate guard bands, and a reference number 504 indicates a middle guard band that prevents interference between the useful bands 501 and 505 or is used for regulating a difference in frequency between signals transmitted in the useful bands 501 and 505.

Particularly, in case of the LTE-A system formed of a plurality of LTE carriers as shown in FIG. 5, bandwidth of the middle guard band 504 is set to a multiple (i.e., an exact number of times) of subcarrier spacing such that an OFDM transmitter of a base station can transmit a plurality of LTE carrier useful band signals by using a single IFFT unit alone. In case of FIG. 5, it is possible to transmit all downlink channel signals contained in the useful bands 501 and 505 through a single IFFT unit corresponding to 30 MHz bandwidth. When subcarrier spacing is 15 kHz and a default value of frequency raster is 100 kHz, bandwidth of the middle guard band 504 can be calculated using Equation 1.

$$\text{Bandwidth of Middle Guard Band} = \\ m*300 \text{ kHz} + 300 \text{ kHz} - \\ \text{MOD}(9 \text{ MHz} + 4.5 \text{ MHz} + 15 \text{ kHz}, 300 \text{ kHz}) = \\ m*300 \text{ kHz} + 285 \text{ kHz}$$

[Equation 1]

In Equation 1, m is zero or positive integer, and 300 kHz is the least common multiple of 15 kHz, i.e., subcarrier spacing, and 100 kHz, i.e., a default value of frequency raster.

Neither bandwidth between two DC subcarriers 503 and 507 except for the middle guard band 504 nor an interval between the center frequencies (=9 MHz+4.5 MHz+15 kHz) is a multiple of 300 kHz. Therefore, bandwidth of the middle guard band 504 should be obtained through Equation 1.

Bandwidth between two center frequencies is equal to the total value that adds bandwidth of the middle guard band, the sum of the half bandwidth of the useful band of each sub-band, and the sum of each half bandwidth of two DC subcarriers. In order to set bandwidth between two center frequencies to a multiple of 300 kHz, the total value that adds the sum of the half bandwidth of the useful band of each sub-band and the sum of each half bandwidth of two DC subcarriers is divided by 300 kHz, and then the remainder after division is subtracted from 300 kHz. A resultant value is determined as bandwidth of the middle guard band. For the above calculation, modulo operation is used.

In Equation 1, modulo operation (MOD) produces the remainder 15 kHz by dividing 4515 kHz by 300 kHz, and 285 kHz is obtained by subtracting this remainder from 300 kHz.

In Equation 1, m is used for preventing interference between two adjacent useful bands, so the value of m is suitably set according to the quantity of interference. The value of m may be fixed depending on bandwidths of adjacent carriers or offered to user equipment through signaling by the system.

Meanwhile, in Equation 1, in order for the center frequency of each sub-band to be present on a frequency raster, an interval between two center frequencies should be a multiple of subcarrier spacing and also be a multiple of a default value of frequency raster.

This means that an interval between two center frequencies should be a multiple of 300 kHz which is the least common multiple of subcarrier spacing and a default value of frequency raster. Here, an interval between two center frequencies is equal to a distance between the exact centers of 15 kHz DC subcarriers 503 and 507 of two sub-bands. That is, bandwidth between two center frequencies except for the middle guard band 504 is the sum of the half spacing of the DC subcarrier 503 in the left band, the half bandwidth of the useful band 501 in the left band, the half bandwidth of the useful band 505 in the right band, and the half spacing of the DC subcarrier 505 in the right band.

Since the sum of the half spacing of the DC subcarrier 503 in the left band and the half spacing of the DC subcarrier 507 in the right band is equal to spacing of a single DC subcarrier, Equation 1 considers 15 kHz that is DC subcarrier spacing. Moreover, by adding an additional value (285 kHz), calculated for setting bandwidth between two center frequencies except for the middle guard band 504 to a multiple of 300 kHz, to the value (a multiple of 300 kHz) of bandwidth of the middle guard band, the above Equation is obtained.

Eventually, when a resultant value obtained from Equation 1 is set as bandwidth of the middle guard band, SCHs of two LTE carriers are present on a frequency raster and also, by selecting a suitable value of m, interference between adjacent useful bands of two LTE carriers may be prevented.

Equation 1 may be used for all cases in which the half bandwidth of each useful band of two LTE carriers is a multiple of 300 kHz. However, if the half bandwidth of the useful band of at least one LTE carrier is not a multiple of 300 kHz, an additional value for setting bandwidth between two center frequencies except for the middle guard band to a multiple of 300 kHz becomes different and therefore values considered in the above Equation should be changed. Such cases will be introduced below.

Second Embodiment

Figure 6:
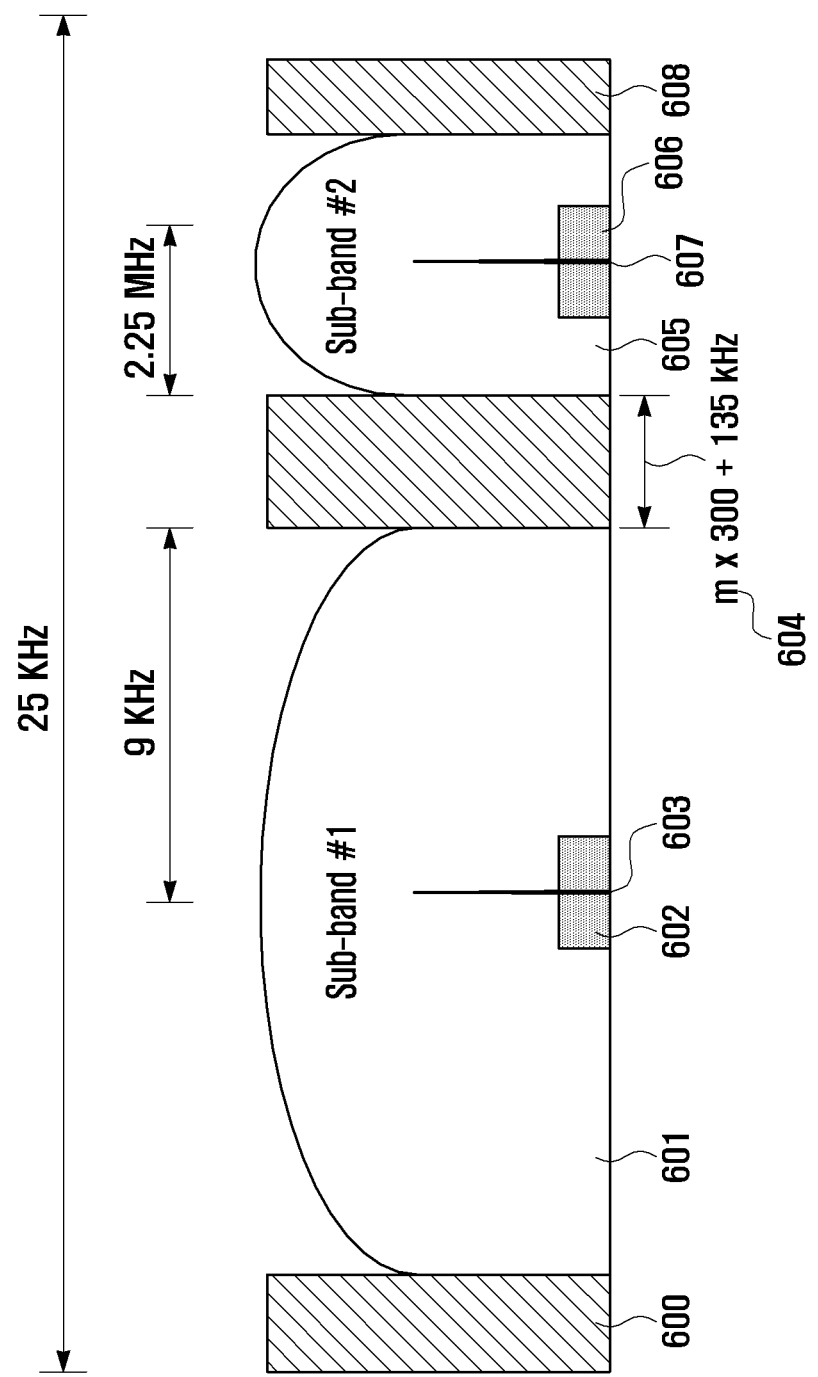
FIG. 6 is a diagram illustrating a method for setting bandwidth of a middle guard band in accordance with another exemplary embodiment of the present invention.

FIG. 6 is a diagram illustrating a method for setting bandwidth of a middle guard band in accordance with another exemplary embodiment of the present invention.

FIG. 6 shows the LTE-A system band with 25 MHz bandwidth formed by the aggregation of one LTE carrier with 20 MHz bandwidth and the other LTE carrier with 5 MHz bandwidth. In sub-bands #1 and #2, reference numbers 601 and 605 indicate a useful band of a 20 MHz LTE carrier and a useful band of a 5 MHz LTE carrier, respectively, and downlink signals are transmitted in the useful bands. Reference numbers 602 and 606 indicate SCHs each of which is transmitted to allow user equipment to perform a cell search in each useful band. Reference numbers 603 and 607 indicate DC subcarriers through which no signal is transmitted. Reference numbers 600 and 608 indicate guard bands, and a reference number 604 indicates a middle guard band.

In the system band as shown in FIG. 6, bandwidth of the middle guard band 604 can be calculated using Equation 2. The bandwidth of the middle guard band is for setting an interval between two DC subcarriers 603 and 607 (or an interval between the center frequencies) to a multiple of subcarrier spacing and further to a multiple of a default value of frequency raster. Here, subcarrier spacing is 15 kHz and a default value of frequency raster is 100 kHz.

$$\text{Bandwidth of Middle Guard Band} = \quad \text{[Equation 2]}$$
$$m * 300 \text{ kHz} + 300 \text{ kHz} -$$
$$\text{MOD}(9 \text{ MHz} + 2.25 \text{ MHz} + 15 \text{ kHz}, 300 \text{ kHz}) =$$
$$m * 300 \text{ kHz} + 135 \text{ kHz}$$

In Equation 2, m is zero or positive integer, and 300 kHz is the least common multiple of 15 kHz, i.e., subcarrier spacing, and 100 kHz, i.e., a default value of frequency raster. Since bandwidth (=9 MHz+2.25 MHz+15 kHz) between two DC subcarriers 603 and 607 except for the middle guard band 604 is not a multiple of 300 kHz, bandwidth of the middle guard band should be obtained through Equation 2.

In Equation 2, modulo operation (MOD) produces the remainder 165 kHz by dividing 11265 kHz by 300 kHz, and 135 kHz is obtained by subtracting this remainder from 300 kHz.

The second embodiment corresponds to case in which the half bandwidth of a useful band of one LTE carrier is a multiple of 300 kHz and the half bandwidth of a useful band of the other LTE carrier is not a multiple of 300 kHz. Therefore, this case is different from the first embodiment in which the half bandwidth of each useful band of two LTE carriers is a multiple of 300 kHz. Namely, since the half bandwidth of a useful band of one of two LTE carriers is not a multiple of 300 kHz, an additional value 135 kHz is required to set this half bandwidth to a multiple of 300 kHz. This is the reason why Equation 2 is different from Equation 1.

Specifically, to set 2.25 MHz to a multiple (2250 kHz+150 kHz) of 300 kHz requires 150 kHz. Also, to set DC subcarrier spacing 15 kHz to a multiple (15 kHz+285 kHz) of 300 kHz requires 285 kHz. Therefore, when the sum of 150 kHz and 285 kHz is divided by 300 kHz, the remainder 135 kHz is obtained. Equation 2 expresses simply this process.

The second embodiment tells that if the half bandwidth of the useful band of any LTE carrier is not a multiple of 300 kHz, an additional value for setting the above half bandwidth to a multiple of 300 kHz depends on the above half bandwidth. Therefore, in the LTE-A system composed of two or more LTE carriers having various bandwidths, depending on bandwidth scalability, the bandwidth of the middle guard band is varied according to combinations of scalable bandwidths.

Third Embodiment

Figure 7:
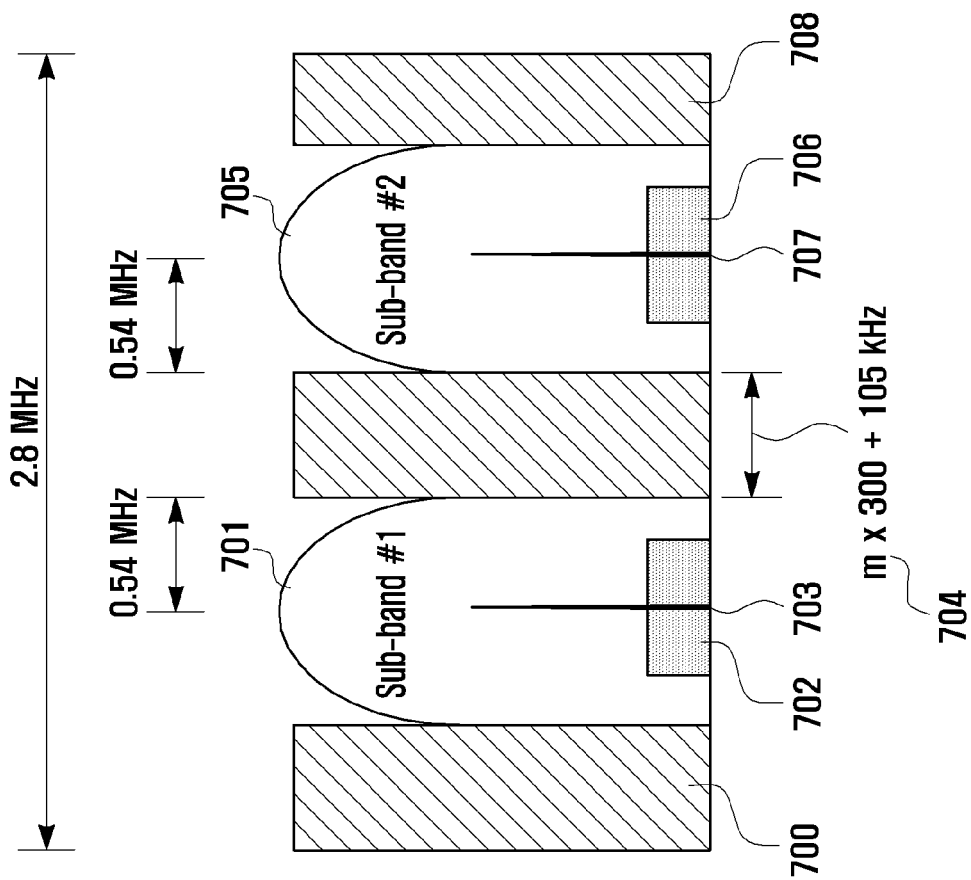
FIG. 7 is a diagram illustrating a method for setting bandwidth of a middle guard band in accordance with still another exemplary embodiment of the present invention.

FIG. 7 is a diagram illustrating a method for setting bandwidth of a middle guard band in accordance with still another exemplary embodiment of the present invention.

FIG. 7 shows the LTE-A system band with 2.8 MHz bandwidth formed by the aggregation of two LTE carriers each of which has 1.4 MHz bandwidth. In sub-bands #1 and #2, each of reference numbers 701 and 705 indicates a useful band of a 1.4 MHz LTE carrier, and downlink signals are transmitted in the useful bands. Reference numbers 702 and 706 indicate SCHs each of which is transmitted to allow user equipment to perform a cell search in each useful band. Reference numbers 703 and 707 indicate DC subcarriers through which no signal is transmitted. Reference numbers 700 and 708 indicate guard bands, and a reference number 704 indicates a middle guard band between the useful bands 701 and 705.

In the system band as shown in FIG. 7, bandwidth of the middle guard band 704 can be calculated using Equation 3. The bandwidth of the middle guard band is for setting an interval between two DC subcarriers 703 and 707 to a multiple of subcarrier spacing and further to a multiple of a default value of frequency raster. Here, subcarrier spacing is 15 kHz and a default value of frequency raster is 100 kHz.

$$\text{Bandwidth of Middle Guard Band} = \quad \text{[Equation 3]}$$
$$m * 300 \text{ kHz} + 300 \text{ kHz} -$$
$$\text{MOD}(0.54 \text{ MHz} + 0.54 \text{ MHz} + 15 \text{ kHz}, 300 \text{ kHz}) =$$
$$m * 300 \text{ kHz} + 105 \text{ kHz}$$

In Equation 3, m is zero or positive integer, and 300 kHz is the least common multiple of 15 kHz, i.e., subcarrier spacing, and 100 kHz, i.e., a default value of frequency raster. Since bandwidth (=0.54 MHz+0.54 MHz+15 kHz) between two DC subcarriers except for the middle guard band 704 is not a multiple of 300 kHz, bandwidth of the middle guard band should be obtained through Equation 3.

In Equation 3, modulo operation (MOD) produces the remainder 195 kHz by dividing 1095 kHz by 300 kHz, and 105 kHz is obtained by subtracting this remainder from 300 kHz.

Contrary to the first and second embodiments, the third embodiment corresponds to case in which the half bandwidth of each useful band of two LTE carriers is not a multiple of 300 kHz. Namely, since the half bandwidth of each useful band of two LTE carriers is not a multiple of 300 kHz, an additional value 105 kHz is required to set this half bandwidth to a multiple of 300 kHz. Specifically, to set 1.08 MHz (=0.54 MHz+0.54 MHz) to a multiple (540 kHz+540 kHz+120 kHz) of 300 kHz requires 120 kHz. Also, to set DC subcarrier spacing 15 kHz to a multiple (15 kHz+285 kHz) of 300 kHz requires 285 kHz. Therefore, when the sum of 120 kHz and 285 kHz is divided by 300 kHz, the remainder 105 kHz is obtained. Equation 3 expresses simply this process.

The first, second and third embodiments tell the bandwidth of the middle guard band allowing the half bandwidth of the useful band of each LTE carrier to be a multiple of 300 kHz. Here, 300 kHz that is the least common multiple of subcarrier spacing and a default value of frequency raster is a critical parameter that determines the bandwidth of the middle guard band. Therefore, in another system having different subcarrier spacing or different default value of frequency raster, the bandwidth of the middle guard band is varied.

Fourth Embodiment

Figure 8:
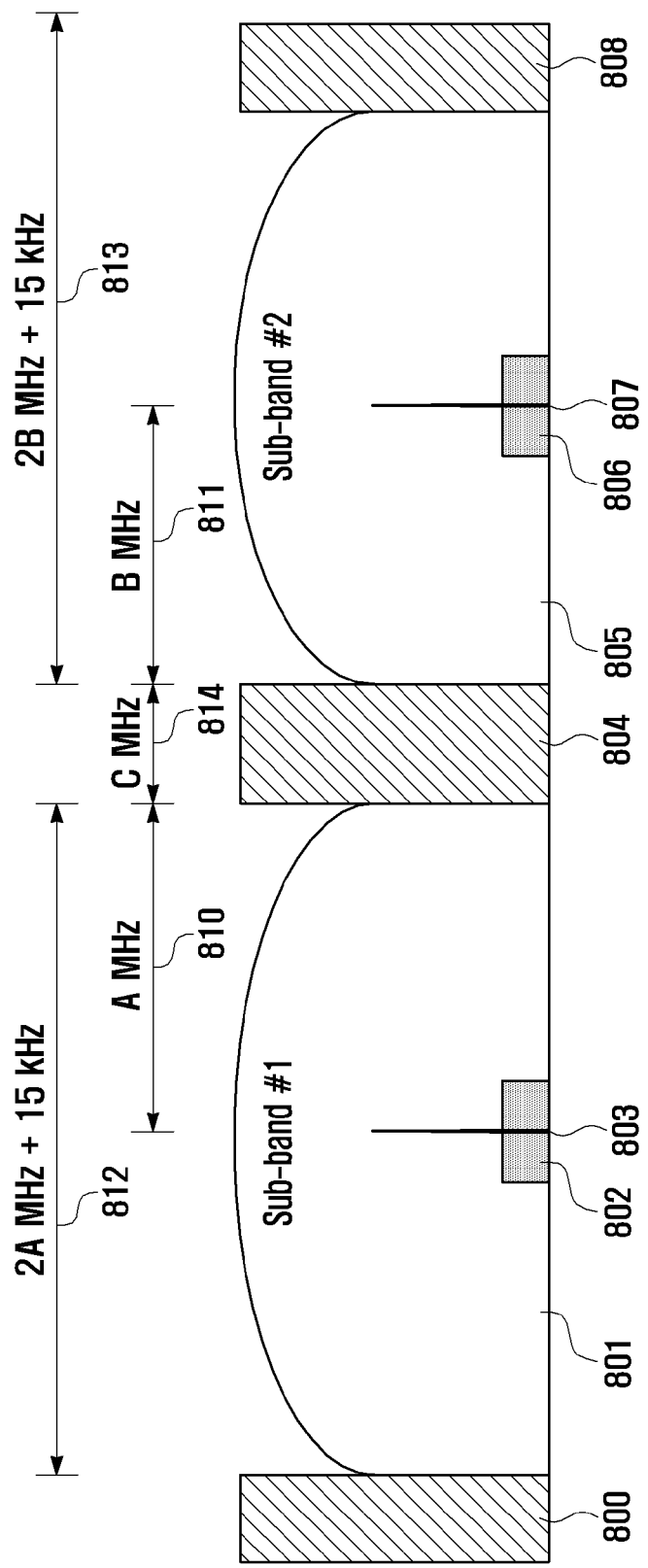
FIG. 8 is a diagram illustrating a method for setting bandwidth of a middle guard band in accordance with yet another exemplary embodiment of the present invention.

FIG. 8 is a diagram illustrating a method for setting bandwidth of a middle guard band in accordance with yet another exemplary embodiment of the present invention.

FIG. 8 shows a generalized LTE-A system band formed by the aggregation of two LTE carriers each of which has any selected bandwidth. In sub-bands #1 and #2, reference numbers 701 and 705 indicate a useful band of each LTE carrier, and downlink signals are transmitted in the useful bands. Reference numbers 802 and 806 indicate SCHs each of which is transmitted to allow user equipment to perform a cell search in each useful band 801 and 805. Reference numbers 803 and 807 indicate DC subcarriers through which no signal is transmitted. Reference numbers 800 and 808 indicate guard bands, and a reference number 804 indicates a middle guard band between the useful bands 801 and 805.

The useful bands 801 and 805 of the LTE carriers have their specific bandwidths of 2A MHz and 2B MHz, respectively. Each of reference numbers 812 and 813 indicates the sum (2A MHz+15 kHz, 2B MHz+15 kHz) of the bandwidth of the useful band and 15 kHz bandwidth of the DC subcarrier.

Here, each of A MHz and B MHz indicated by reference numbers 810 and 811 means the half bandwidth of the useful band of each LTE carrier. Reference numbers 802 and 806 indicate SCHs each of which is transmitted to allow user equipment to perform a cell search in each useful band 801 and 805. Reference numbers 803 and 807 indicate DC subcarriers through which no signal is transmitted. Reference numbers 800 and 808 indicate guard bands, and a reference number 804 indicates a middle guard band between the useful bands 801 and 805.

In the system band as shown in FIG. 8, subcarrier spacing is D kHz and a default value of frequency raster is E kHz. Here, bandwidth of the middle guard band is for setting an interval between two DC subcarriers 803 and 807 to a multiple of subcarrier spacing and further to a multiple of a default value of frequency raster.

$$\text{Bandwidth of Middle Guard Band} = m*G \text{ kHz} + G \text{ kHz} - \text{MOD}(A \text{ MHz} + B \text{ MHz} + D \text{ kHz}, G \text{ kHz}) \quad [\text{Equation 4}]$$

In Equation 4, m is zero or positive integer, and G kHz is the least common multiple of subcarrier spacing D kHz and a default value E kHz of frequency raster. In order to set bandwidth (=A MHz+B MHz+D kHz) between two DC subcarriers (or between the center frequencies) except for the middle guard band to a multiple of G kHz, bandwidth of the middle guard band should be obtained through Equation 4.

The LTE system has a variety of system bandwidths such as 20 MHz, 15 MHz, 10 MHz, 5 MHz, 3 MHz, and 1.4 MH. Here, the bandwidth of the useful band in each system bandwidth is 18 MHz, 13.5 MHz, 9 MHz, 4.5 MHz, 2.7 MHz, or 1.08 MH. Therefore, the half bandwidth of the useful band, corresponding to A MHz or B MHz, is 9 MHz, 6.75 MHz, 4.5 MHz, 2.25 MHz, 1.35 MHz, or 0.54 MH. Table 1 given below shows various bandwidths of the middle guard band added to the LTE carriers having various system bandwidths as discussed above. Table 1 is on the assumption that subcarrier spacing D is 15 kHz and a frequency raster default value E is 100 kHz. For example, in case of an LTE carrier with 1.4 MHz bandwidth, the half bandwidth of the useful band is 0.54 MHz. So, in order to set this value to a multiple of 300 kHz that is the least common multiple of subcarrier spacing 15 kHz and a frequency raster default value 100 kHz, additional bandwidth 60 kHz is required for bandwidth of the middle guard band. Similarly, in case of the other cases, values of additional bandwidth required for bandwidth of the middle guard band are obtained as set forth in Table 1.

Table 1 is to illustrate bandwidths of the middle guard band added to various system bandwidths of the LTE carriers.

TABLE 1

| System Bandwidth of LTE Carrier (MHz) | Bandwidth of Useful Band (MHz) | Half Bandwidth of Useful Band (MHz) | Bandwidth of Edge Guard Band in LTE System Band (MHz) | Additional Bandwidth for Middle Guard Band (MHz) |
|---|---|---|---|---|
| 1.4 | 1.08 | 0.54 | 0.32 | 0.06 |
| 3 | 2.7 | 1.35 | 0.3 | 0.15 |
| 5 | 4.5 | 2.25 | 0.5 | 0.15 |
| 10 | 9 | 4.5 | 1 | 0 |
| 15 | 13.5 | 6.75 | 1.5 | 0.15 |
| 20 | 18 | 9 | 2 | 0 |

Therefore, by using specific bandwidth of the middle guard band based on various system bandwidths of the LTE carriers set forth in Table 1, it is possible to obtain bandwidth of the middle guard band for any combination of two LTE carriers having any system bandwidth. This is shown in Table 2.

Table 2 given below is to illustrate a method for setting the bandwidth of the middle guard band for any combination of two LTE carriers having any system bandwidth.

TABLE 2

| System Bandwidth of LTE Carrier 1 (MHz) | System Bandwidth of LTE Carrier 2 (MHz) | Bandwidth of Middle Guard Band |
|---|---|---|
| 10, 20 | 10, 20 | m * 300 kHz + 285 kHz |
| 3, 5, 15 | 3, 5, 15 | m * 300 kHz + 285 kHz |
| 1.4 | 1.4 | m * 300 kHz + 105 kHz |
| 10, 20 | 3, 5, 15 | m * 300 kHz + 135 kHz |
| 10, 20 | 1.4 | m * 300 kHz + 45 kHz |
| 3, 5, 15 | 1.4 | m * 300 kHz + 195 kHz |

Referring to Tables 1 and 2, when the system bandwidths of LTE carriers 1 and 2 are 5 MHz and 15 MHz, respectively, the bandwidth of the middle guard band added to each LTE carrier is 150 kHz as set forth in Table 1, and totally added bandwidth of the middle guard band becomes 300 kHz. Therefore, by adding 300 kHz to 285 kHz required for making the DC subcarrier 15 kHz a multiple of 300 kHz and then dividing the sum by 300 kHz, the bandwidth of the middle guard band is obtained using the remainder 285 kHz. Since totally added bandwidth of the middle guard band is a multiple of 300 kHz in this case, the bandwidth of the middle guard is equal to that in case where the half bandwidth of each useful band of two LTE carriers is 300 kHz.

In another example, when the system bandwidths of LTE carriers 1 and 2 are 5 MHz and 1.4 MHz, respectively, the bandwidths of the middle guard band added to these LTE carriers are 150 kHz and 60 kHz as set forth in Table 1, and totally added bandwidth of the middle guard band becomes 210 kHz. Therefore, by adding 210 kHz to 285 kHz required for making the DC subcarrier 15 kHz a multiple of 300 kHz and then dividing the sum by 300 kHz, the bandwidth of the middle guard band is obtained using the remainder 195 kHz.

Using such results, the bandwidth of the middle guard band can be determined according to system bandwidth of each LTE carrier. Here, the value of m may be fixed in the system. Alternatively, a base station may determine this value and offer it to user equipment through system information (SI) or physical broadcast channel (PBCH).

The above-discussed Equations and Tables are used for determining the bandwidth of the middle guard band between two adjacent LTE carriers. However, they may also be applied to other systems having a number of LTE carriers more than two. In these cases, the values of m used for determining the bandwidth of the middle guard band between each pair of two adjacent LTE carriers may be equal to or different from each other.

Fifth Embodiment

Figure 9:
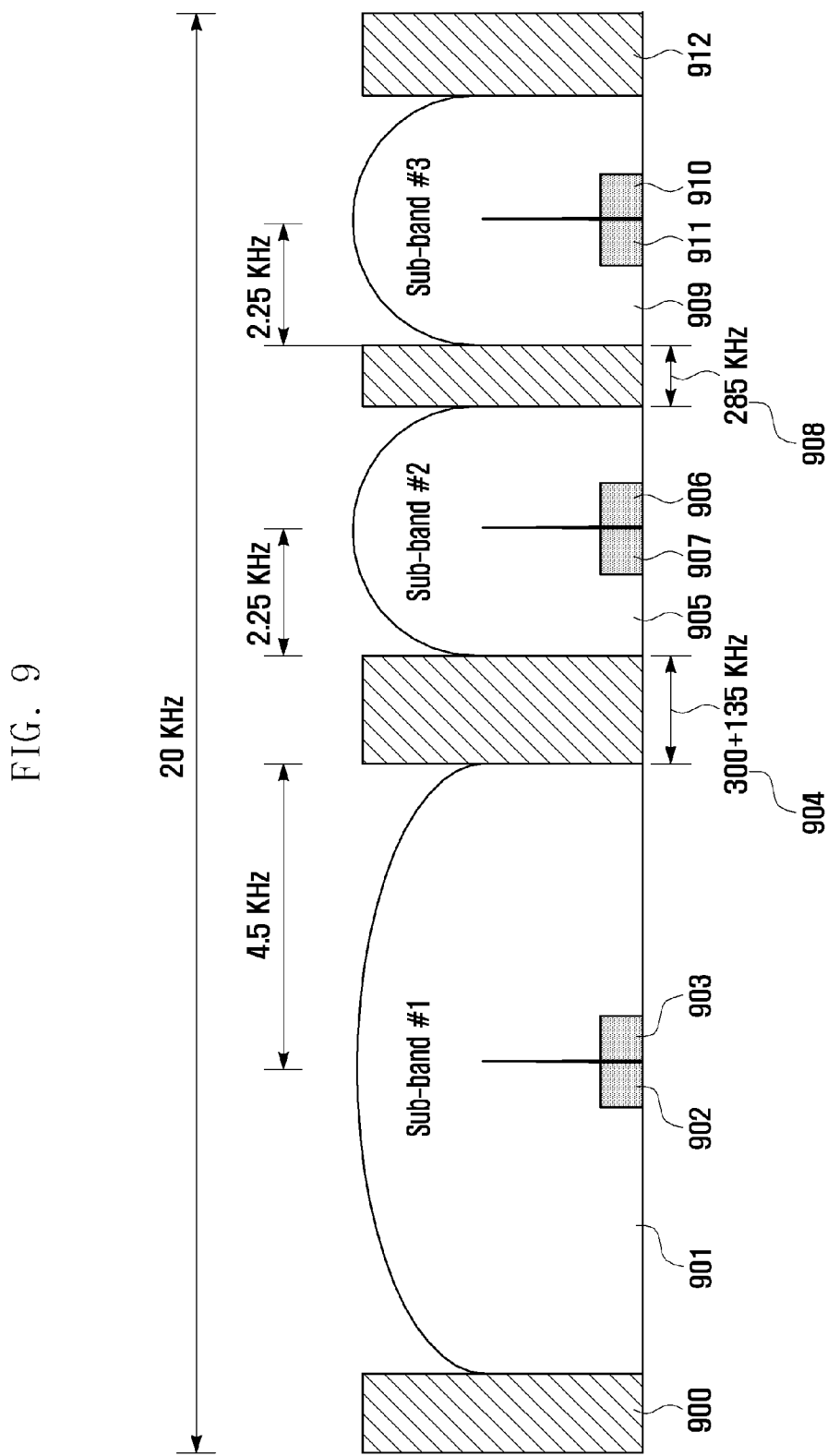
FIG. 9 is a diagram illustrating a method for setting bandwidth of a middle guard band in accordance with further another exemplary embodiment of the present invention.

FIG. 9 is a diagram illustrating a method for setting bandwidth of a middle guard band in accordance with further another exemplary embodiment of the present invention.

FIG. 9 shows the LTE-A system band with 20 MHz bandwidth formed by the aggregation of three LTE carriers having 10 MHz, 5 MHz and 5 MHz bandwidths. In FIG. 9, two middle guard bands 904 and 905 have bandwidth of 435 kHz and bandwidth of 285 kHz, respectively. These are based on Table 2 that shows the bandwidth of the middle guard band in one case of system bandwidths 10 MHz and 5 MHz of LTE carriers 1 and 2 and in another case of system bandwidths 5 MHz and 5 MHz of LTE carriers 1 and 2.

Here, the values of m are set to 1 and 0. The above bandwidths of two middle guard bands 904 and 908 make each SCH 903, 907 and 911 a common multiple of subcarrier bandwidth 15 kHz and frequency raster 100 kHz and thereby allow a reception of SCH in each sub-band. Additionally, even though the only single IFFT unit is used, it is possible to transmit all downlink channel signals in useful bands 901, 905 and 909 of the respective sub-bands.

On the one hand, the value of m used for determining the bandwidth of the first middle guard band 904 is 1. Namely, the bandwidth of the first middle guard band 904 between the sub-bands #1 and #2 is determined as 435 kHz (=300+135), greater than possible minimum bandwidth 135 kHz of the middle guard band, in consideration of interference between sub-bands. On the other hand, the value of m used for determining the bandwidth of the second middle guard band 908 is 0. Namely, the bandwidth of the second middle guard band 908 between the sub-bands #2 and #3 is determined as 285 kHz since possible minimum bandwidth 285 kHz of the middle guard band is enough to prevent interference between sub-bands.

Therefore, considering the extent of interference between sub-bands, a base station may determine the value of m and then regulate the bandwidth of the middle guard band.

Figure 10:
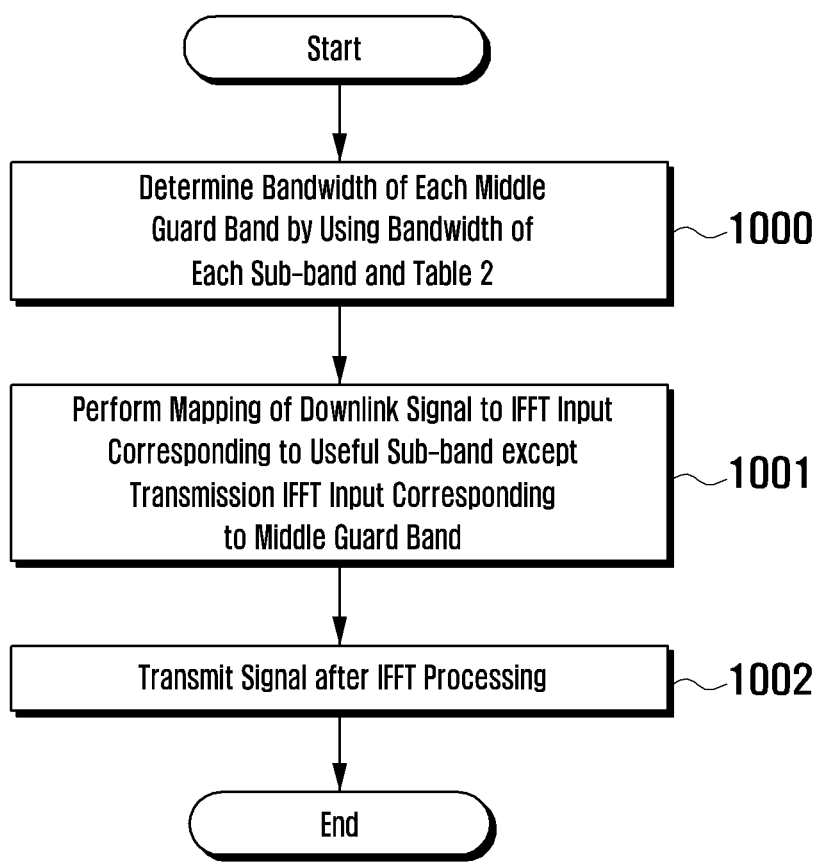
FIG. 10 is a flow diagram illustrating a method for transmitting a downlink signal at a base station in accordance with an exemplary embodiment of the present invention.

Now, methods for performing a communication through the above-discussed allocation of bandwidth of the middle guard band will be described hereinafter. FIG. 10 is a flow diagram illustrating a method for transmitting a downlink signal at a base station in accordance with an exemplary embodiment of the present invention.

Referring to FIG. 10, a base station determines the bandwidth of each middle guard band by using the bandwidth of each sub-band and further using Table 2 or the above-discussed Equations (step 1000). Namely, when performing a communication using at least two carriers, the base station determines the bandwidth of the middle guard band such that an interval between two center frequencies of two adjacent carriers becomes a multiple of the least common multiple of subcarrier spacing and a frequency raster default value. Additionally, the base station determines the value of m, one of system parameters, depending on the extent of interference between adjacent sub-bands.

Next, the base station performs a mapping between a downlink signal and an IFFT input corresponding to the useful sub-band except a transmission IFFT input corresponding to the middle guard band (step 1001). Then the base station transmits a signal to user equipment after IFFT processing (step 1002).

Meanwhile, in order to reduce PAPR (Peak-to-Average Power Ratio) of a downlink signal being transmitted, the base station may further perform an additional mapping between a specific signal and an IFFT input corresponding to a part of the middle guard band or all subcarriers in step 901.

Figure 11:
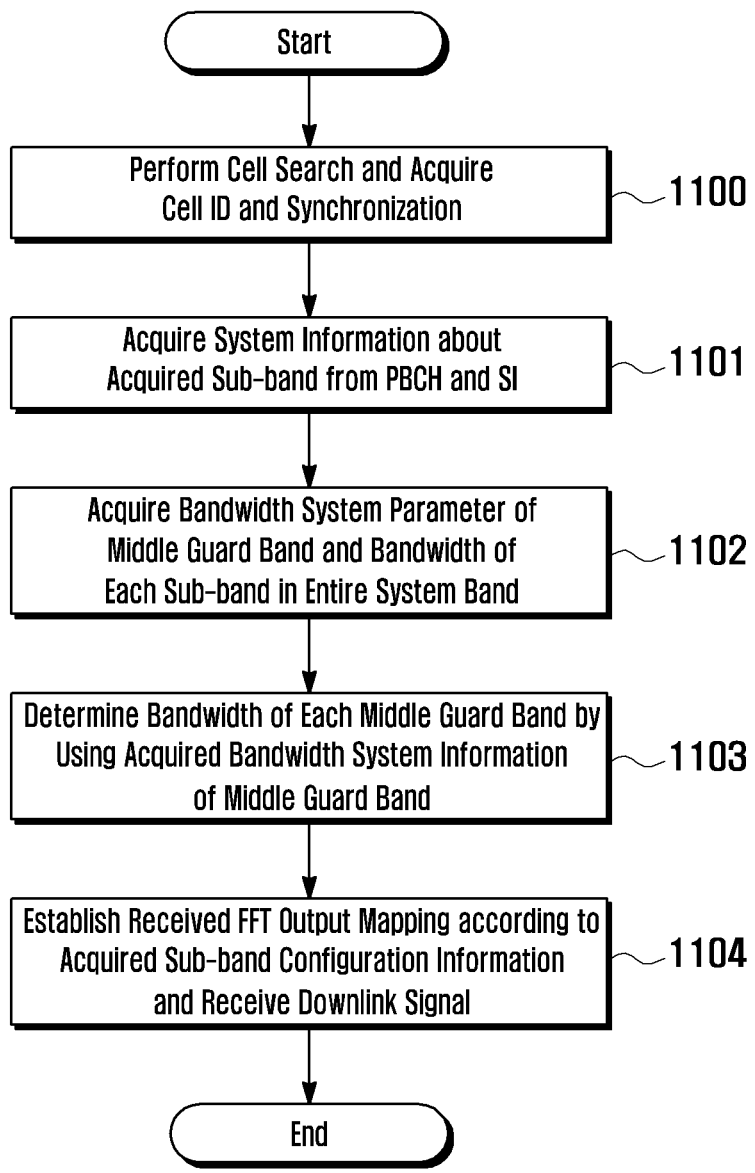
FIG. 11 is a flow diagram illustrating a method for receiving a downlink signal at user equipment in accordance with an exemplary embodiment of the present invention.

Now, a method for receiving a signal that is transmitted through the above-discussed method for setting the middle guard band will be described hereinafter. FIG. 11 is a flow diagram illustrating a method for receiving a downlink signal at user equipment in accordance with an exemplary embodiment of the present invention.

Referring to FIG. 11, user equipment performs a cell search using received SCH and acquires a cell ID and synchronization (step 1100).

Thereafter, the user equipment acquires system information about synchronization-acquired sub-band from PBCH and SI (step 1101). Then the user equipment acquires bandwidth system parameter of the middle guard band and bandwidth of each sub-band in the entire system band (step 1102). Here, bandwidth system parameter of the middle guard band is denoted as m.

Next, the user equipment calculates the bandwidth of each middle guard band by using the acquired bandwidth system parameter of the middle guard band (step 1103). Then the user equipment establishes a received FFT output mapping according to the acquired sub-band configuration information and receives a downlink signal (step 1104). Namely, the user equipment performs a mapping between a received FFT output and the useful band except the bandwidth of the middle guard band and then receives a mapped downlink signal.

In case of FIGS. 10 and 11, the base station transmits the bandwidth of each sub-band and the value of m in the entire system band to the user equipment such that the user equipment can recognize the bandwidth of the middle guard band. Then, using received values, the user equipment calculates the bandwidth of the middle guard band.

In order not only to simplify system information to be transmitted, but also to remove calculation load of the bandwidth of the middle guard band from the user equipment, the value of m used for determining the bandwidth of the middle guard band set forth in Table 2 may be predefined for each combination and offered to both the base station and the user equipment. In this case, the user equipment may acquire only information about bandwidth of each sub-band in the entire system band so as to obtain the bandwidth of each fixed middle guard band between sub-bands.

Additionally, the base station may not transmit information about the bandwidth of all sub-bands in the entire system band, but adjacent sub-bands only, such that the user equipment can set the middle guard band between adjacent LTE carriers.

If the bandwidth of each sub-band in the entire system band is fixed and if the bandwidth of the middle guard band between respective sub-bands is variable, the user equipment can know the bandwidth of adjacent LTE carriers by using the value of its own DC subcarrier frequency. Therefore, once acquiring bandwidth system parameter m of the middle guard band from the base station, the user equipment can obtain the bandwidth of the middle guard band by using Table 2 or the above Equations.

Further simpler case is that the bandwidth of each sub-band in the entire system band is fixed in advance and also the bandwidth of each middle guard band between respective sub-bands is fixed in advance after obtained through a calculation using Table 2 or the above Equations. In this case, the user equipment can know the bandwidth of the middle guard band from only the DC subcarrier frequency. As discussed heretofore, there are many available methods for determining the bandwidth of the middle guard band, and one of them may be selected in consideration of capability of the user equipment and operation efficiency in the system.

Now, configurations of the base station and user equipment for performing a communication by allocating the bandwidth of the middle guard band as discussed above will be described hereinafter.

Figure 12:
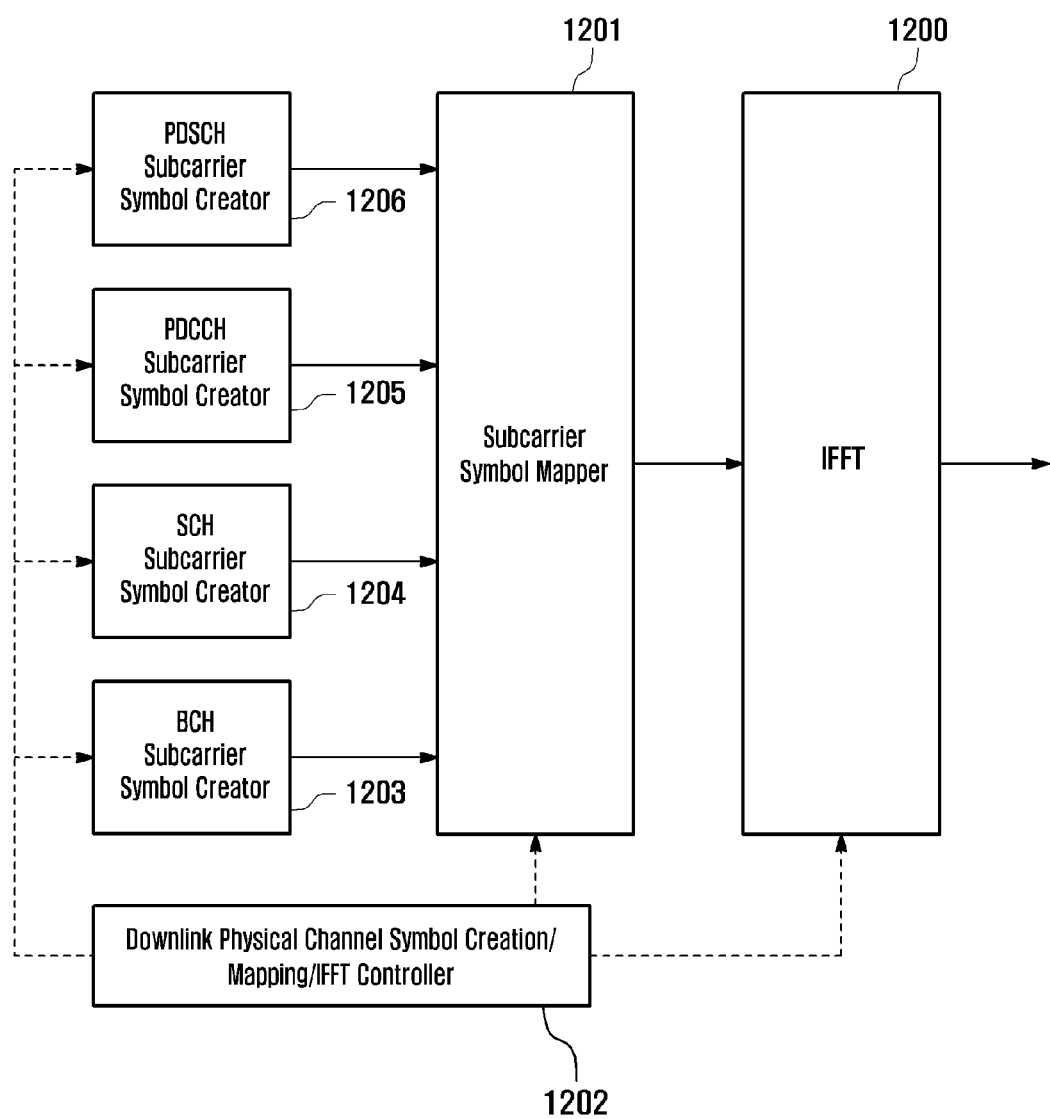
FIG. 12 is a block diagram illustrating a transmitter of a base station for transmitting a downlink signal in accordance with an exemplary embodiment of the present invention.

First, the configuration of the base station that transmits a downlink signal will be described. FIG. 12 is a block diagram illustrating a transmitter of a base station for transmitting a downlink signal in accordance with an exemplary embodiment of the present invention.

Referring to FIG. 12, the transmitter of the base station includes an IFFT unit 1200, a subcarrier symbol mapper 1201, a controller 1202 (i.e., a downlink physical channel symbol creation/mapping/IFFT controller), a broadcasting channel symbol creator 1203 (i.e., a BCH subcarrier symbol creator), a synchronization channel symbol creator 1204 (i.e., an SCH subcarrier symbol creator), a control channel symbol creator 1205 (i.e., a PDCCH subcarrier symbol creator), and a data channel symbol creator 1206 (i.e., a PDSCH subcarrier symbol creator).

The broadcasting channel symbol creator 1203, the synchronization channel symbol creator 1204, the control channel symbol creator 1205 and the data channel symbol creator 1206 create subcarrier symbols of BCH, SCH, PDCCH and PDSCH channels, respectively. These creators 1203, 1204, 1205 and 1026 will be generically referred to as symbol creators.

The subcarrier symbol mapper 1201 performs a mapping of subcarrier symbols of BCH, SCH, PDCCH and PDSCH channels to suitable inputs of the IFFT unit 1100, depending on subcarriers to which symbols of respective channels should be mapped.

The controller 1202 determines the bandwidth of each middle guard band. Namely, the controller 1202 determines the bandwidth of the middle guard band between adjacent sub-bands such that an interval between the center frequencies of two adjacent sub-bands becomes a multiple of the least common multiple of subcarrier spacing and a frequency raster default value.

Then the controller 1202 performs a mapping between the symbol-mapped subcarriers and the IFFT inputs corresponding to the useful sub-bands except IFFT inputs corresponding to the middle guard bands. Namely, the controller 1202 controls the subcarrier symbol mapper 1201 such that subcarrier symbols are mapped to the input of the IFFT unit 1200, excluding signals corresponding to the middle guard bands from the input of the IFFT unit 1200.

Additionally, the controller 1202 allows symbols of the above channels to be mapped to exact inputs of the IFFT unit 1100 in the corresponding subframe or sub-band. For example, under the control of the controller 1202, SCH may be mapped to each sub-band in the IFFT inputs corresponding to sub-bands #1 and #2 shown in FIG. 4.

Meanwhile, in order to reduce PAPR of a downlink signal transmitted from the base station, the controller 1202 may further allow a specific signal to be mapped to a part of the middle guard band or all subcarriers.

Figure 13:
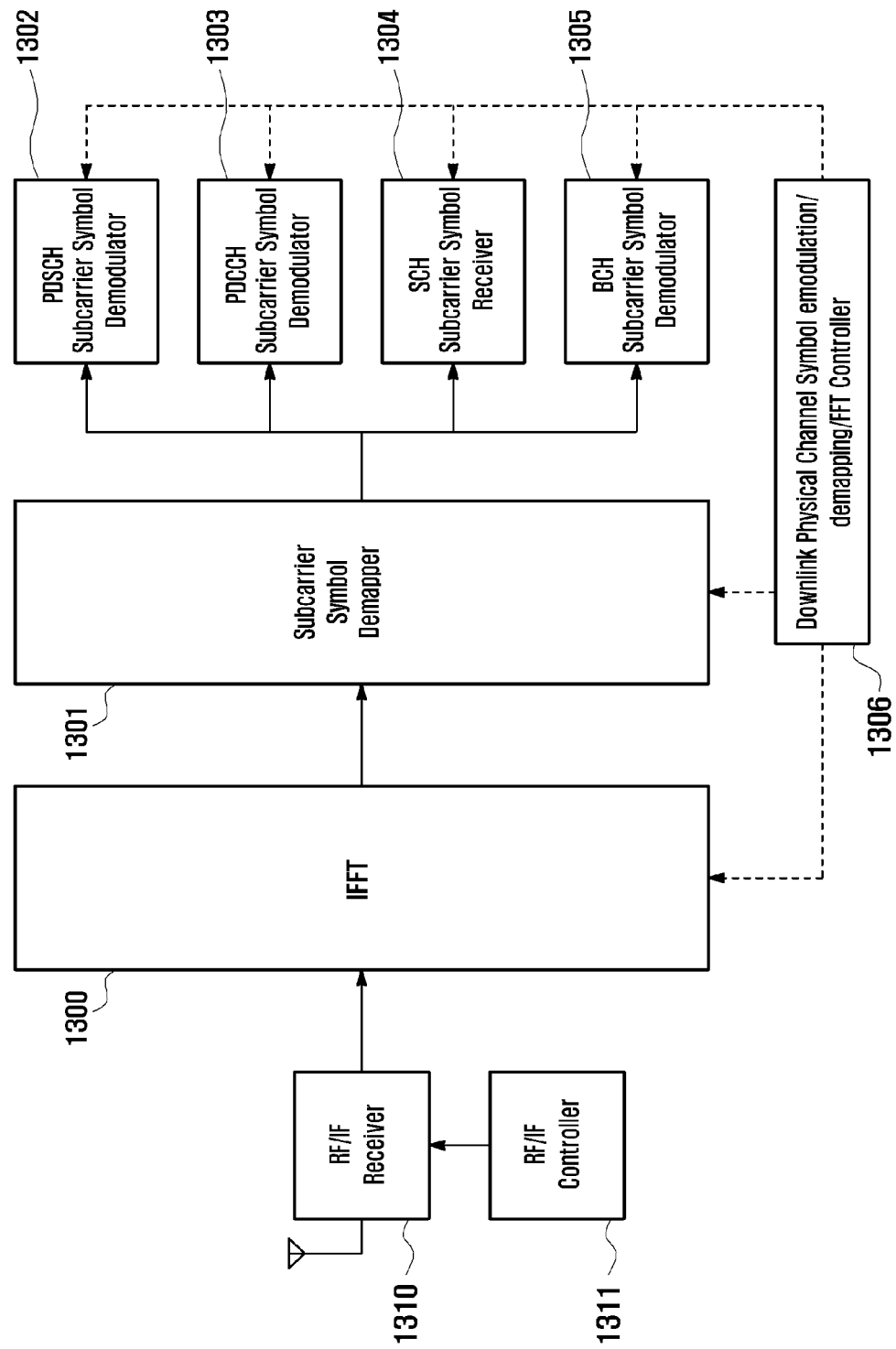
FIG. 13 is a block diagram illustrating a receiver of user equipment for receiving a downlink signal in accordance with an exemplary embodiment of the present invention.

Next, the configuration of the user equipment that receives a downlink signal will be described. FIG. 13 is a block diagram illustrating a receiver of user equipment for receiving a downlink signal in accordance with an exemplary embodiment of the present invention.

Referring to FIG. 13, the receiver of the user equipment includes an RF/IF (radio frequency/intermediate frequency) receiver 1310, an RF/IF controller 1311, an FFT unit 1300, a subcarrier symbol demapper 1301, a data channel symbol demodulator 1302 (i.e., a PDSCH subcarrier symbol demodulator), a control channel symbol demodulator 1303 (i.e., a PDCCH subcarrier symbol demodulator), a synchronization channel symbol receiver 1304 (i.e., an SCH subcarrier symbol receiver), a broadcasting channel symbol demodulator 1305 (i.e., a BCH subcarrier symbol demodulator), and a controller 1306 (i.e., a downlink physical channel symbol demodulation/demapping/FFT controller).

The RF/IF receiver 1310 establishes bandwidth and center frequency under the control of the RF/IF controller 1311 so as to receive a downlink signal for a sub-band on which the user equipment is camped.

The FFT unit 1300 performs Fourier transform for a received downlink OFDM signal and then outputs received subcarrier symbols.

The subcarrier symbol demapper 1301 enters the received subcarrier symbols into the demodulators 1302 to 1305 of a corresponding channel.

The data channel symbol demodulator 1302, the control channel symbol demodulator 1303 and the broadcasting channel symbol demodulator 1305 perform demodulation for the received subcarrier symbols of a corresponding channel and thereby obtain desired data.

The synchronization channel symbol receiver 1304 finds PSS/SSS (Primary Synchronized Signal/Secondary Synchronized Signal) sequence applied to a current cell by performing correlation between received PSS/SSS and possible PSS/SSS sequences in a cell search and thereby obtains synchronization.

The data channel symbol demodulator 1302, the control channel symbol demodulator 1303, the synchronization channel symbol receiver 1304 and the broadcasting channel symbol demodulator 1305 will be generically referred to as symbol receivers.

The controller 1306 establishes an output mapping of the FFT unit 1300 by calculating the bandwidth of each middle guard band from system information received through the broadcasting channel symbol demodulator 1305 or the data channel symbol demodulator 1302 and, when receiving a corresponding OFDM symbol of each channel, controls a demodulation through a demapping in a corresponding FFT output.

Namely, when synchronization for at least two sub-bands is acquired, the controller 1306 calculates the bandwidth of the middle guard band by using bandwidth of synchronization-acquired sub-band and bandwidth system parameter m of the middle guard band. Then the controller 1306 establishes an output mapping of the FFT unit 1300 according to the calculated bandwidth of the middle guard band such that symbols for signals of useful bands except signals of the middle guard band can be used, and controls the subcarrier symbol demapper 1301 such that the symbols can be inputted in the corresponding symbol receivers.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for transmitting a downlink signal with a guard band between at least two sub-bands at a base station in a cellular radio communication system that supports bandwidth scalability, the method comprising:

mapping the downlink signal to an IFFT (Inverse Fast Fourier Transform) input corresponding to a useful band except for a middle guard band between adjacent sub-bands among the at least two sub-bands; and transmitting the mapped downlink signal, wherein a bandwidth of the middle guard band is determined such that an interval between center frequencies of the adjacent sub-bands becomes a common multiple of subcarrier spacing and a frequency raster default value.

2. The method of claim 1, wherein the bandwidth of the middle guard band is determined using the following Equation:

Bandwidth of Middle Guard Band=$m*G+G$−MOD$(A+B+D,G)$, wherein m is zero or a positive integer, wherein G is a least common multiple of the subcarrier spacing and the frequency raster default value, and wherein each of A and B is a half bandwidth of each useful band of the adjacent sub-bands, and wherein D is a bandwidth of a Direct Current(DC) subcarrier.

3. A method for receiving a downlink signal with a guard band between at least two sub-bands at user equipment in a cellular radio communication system that supports bandwidth scalability, the method comprising:

mapping the received downlink signal to an FFT (Fast Fourier Transform) output, the received downlink signal corresponding to a useful band except a middle guard band between adjacent sub-bands among the at least two sub-bands; and receiving the mapped downlink signal, wherein a bandwidth of the middle guard band is determined such that an interval between center frequencies of the adjacent sub-bands becomes a common multiple of subcarrier spacing and a frequency raster default value.

4. The method of claim 3, wherein the bandwidth of the middle guard band is determined using the following Equation:

Bandwidth of Middle Guard Band=$m*G+G$−MOD$(A+B+D,G)$, wherein m is zero or a positive integer, wherein G is a least common multiple of the subcarrier spacing and the frequency raster default value, and wherein each of A and B is a half bandwidth of each useful band of the adjacent sub-bands, and wherein D is bandwidth of a Direct Current(DC) subcarrier.

5. The method of claim 4, wherein the bandwidth of the middle guard band is calculated using the Equation after the m, which is a bandwidth system parameter of the middle guard band, and bandwidth of each useful band of the adjacent sub-bands is acquired from a base station.

6. An apparatus for transmitting a downlink signal with a guard band between at least two sub-bands at a base station in a cellular radio communication system that supports bandwidth scalability, the apparatus comprising:

an IFFT (Inverse Fast Fourier Transform) unit configured to receive signals to be transmitted, to perform IFFT on the signals, and output the signals;

a subcarrier symbol mapper configured to perform a mapping of the received signals to an IFFT input corresponding to a useful band except a middle guard band between adjacent sub-bands among the at least two sub-bands; and a controller configured to determine a bandwidth of the middle guard band such that an interval between center frequencies of the adjacent sub-bands becomes a common multiple of subcarrier spacing and a frequency raster default value.

7. The apparatus of claim 6, wherein the controller is further configured to determine the bandwidth of the middle guard band through the following Equation:

Bandwidth of Middle Guard Band=$m*G+G$−MOD$(A+B+D,G)$, wherein m is zero or a positive integer, wherein G is a least common multiple of the subcarrier spacing and the frequency raster default value, and wherein each of A and B is a half bandwidth of each useful band of the adjacent sub-bands, and wherein D is bandwidth of a Direct Current(DC) subcarrier.

8. An apparatus for receiving a downlink signal with a guard band between at least two sub-bands at user equipment in a cellular radio communication system that supports bandwidth scalability, the apparatus comprising:

an FFT (Fast Fourier Transform) unit configured to transform received signals and to output the transformed signals;

symbol receivers configured to receive the output FFT signals in corresponding channels and to demodulate the output FFT signals;

a subcarrier symbol demapper configured to map the output FFT signals, the output FFT signals corresponding to a useful band except a middle guard band between adjacent sub-bands among the at least two sub-bands, and to enter the mapped FFT output into the symbol receivers; and a controller configured to determine bandwidth of the middle guard band such that an interval between center frequencies of the adjacent sub-bands becomes a common multiple of subcarrier spacing and a frequency raster default value.

9. The apparatus of claim 8, wherein the controller is further configured to determine the bandwidth of the middle guard band through the following Equation:

Bandwidth of Middle Guard Band=$m*G+G$−MOD$(A+B+D,G)$, wherein m is zero or a positive integer, wherein G is a least common multiple of the subcarrier spacing and the frequency raster default value, and wherein each of A and B is a half bandwidth of each useful band of the adjacent sub-bands, and wherein D is bandwidth of a Direct Current(DC) subcarrier.

10. The apparatus of claim 9, wherein the controller is further configured to calculate the bandwidth of the middle guard band through the Equation after acquiring the m, which is a bandwidth system parameter of the middle guard band, and bandwidth of each useful band of the adjacent sub-bands from a base station.

* * * * *